US008381055B2

(12) United States Patent
Christiaens et al.

(10) Patent No.: US 8,381,055 B2
(45) Date of Patent: Feb. 19, 2013

(54) SYSTEM FOR COMMUNICATING DATA IN XDSL USING DATA RETRANSMISSION

(75) Inventors: Benoit Christiaens, Brussels (BE); Miguel Peeters, Woluwe St. Lambert (BE); Raphael Cassiers, Waterloo (BE)

(73) Assignee: Broadcom Corporation, Irvine, CA (US)

( * ) Notice: Subject to any disclaimer, the term of this patent is extended or adjusted under 35 U.S.C. 154(b) by 1313 days.

(21) Appl. No.: 11/854,022

(22) Filed: Sep. 12, 2007

(65) Prior Publication Data

US 2008/0063007 A1  Mar. 13, 2008

Related U.S. Application Data

(60) Provisional application No. 60/907,833, filed on Apr. 18, 2007, provisional application No. 60/825,542, filed on Sep. 13, 2006.

(51) Int. Cl.
*G08C 25/02* (2006.01)
*H04L 1/18* (2006.01)

(52) U.S. Cl. ....................................................... 714/748
(58) Field of Classification Search .................... 714/748
See application file for complete search history.

(56) References Cited

U.S. PATENT DOCUMENTS

| | | | |
|---|---|---|---|
| 5,434,847 A | 7/1995 | Kou | |
| 5,959,994 A * | 9/1999 | Boggs et al. | 370/399 |
| 5,970,253 A | 10/1999 | Purdham | |
| 6,373,842 B1 | 4/2002 | Coverdale et al. | |
| 6,694,470 B1 | 2/2004 | Palm | |
| 7,058,027 B1 * | 6/2006 | Alessi et al. | 370/310.1 |
| 7,120,429 B2 | 10/2006 | Mincar et al. | |
| 7,197,317 B2 * | 3/2007 | Parkvall et al. | 455/452.1 |
| 7,234,086 B1 | 6/2007 | de Koos et al. | |
| 7,330,432 B1 | 2/2008 | Revsin et al. | |
| 7,359,359 B2 * | 4/2008 | Parkvall et al. | 370/337 |
| 7,382,732 B2 * | 6/2008 | Peisa et al. | 370/236 |
| 7,403,541 B2 * | 7/2008 | Yi et al. | 370/469 |
| 7,561,523 B1 | 7/2009 | Revsin et al. | |
| 7,630,862 B2 | 12/2009 | Glas et al. | |
| 7,657,815 B2 * | 2/2010 | Seidel et al. | 714/748 |
| 7,970,733 B2 * | 6/2011 | Christiaens et al. | 707/602 |
| 2002/0080727 A1 | 6/2002 | Kim et al. | |
| 2002/0167949 A1 | 11/2002 | Bremer et al. | |

(Continued)

FOREIGN PATENT DOCUMENTS

CN   1318245 A   10/2001
KR   10-2002-0000650   1/2002

OTHER PUBLICATIONS

English-language Abstract of KR 20020000650, published Jan. 5, 2002, 1 page, printed from http://v3.espacenet.com/publicationDetails/biblio?adjacent=true&KC=A&date=20020105....

(Continued)

*Primary Examiner* — Joseph D Torres
(74) *Attorney, Agent, or Firm* — Sterne, Kessler, Goldstein & Fox P.L.L.C.

(57) ABSTRACT

An apparatus for transmitting data in an xDSL system is disclosed. In an exemplary embodiment, the apparatus comprises a transmitter that sends data over an xDSL system in the form of a data transmission unit (DTU), the transmitter having physical media specific—transmission convergence (PMS-TC) communication sublayer. The apparatus may further include a retransmission unit that is implemented in the PMS-TC sublayer. The retransmission unit may include a retransmission buffer that stores and indexes transmitted DTUs in retransmit containers. The retransmit container may be defined as a time slot corresponding to a sent DTU, wherein the retransmission unit is configured to respond to a retransmission request indicating which stored DTU should be retransmitted. The stored DTU to be retransmitted may be identified by its corresponding retransmit container.

5 Claims, 13 Drawing Sheets

U.S. PATENT DOCUMENTS

| | | | |
|---|---|---|---|
| 2003/0076826 | A1 | 4/2003 | Blasiak et al. |
| 2003/0208772 | A1 | 11/2003 | Milbrandt |
| 2004/0202181 | A1 | 10/2004 | Mitchell |
| 2005/0025090 | A1 | 2/2005 | Klein et al. |
| 2005/0094667 | A1 | 5/2005 | Dahlman et al. |
| 2005/0135412 | A1 | 6/2005 | Fan |
| 2005/0286566 | A1 | 12/2005 | Tong et al. |
| 2006/0029101 | A1 | 2/2006 | Williams |
| 2006/0203760 | A1 | 9/2006 | Fukui et al. |
| 2006/0215689 | A1 | 9/2006 | Liu et al. |
| 2007/0071177 | A1 | 3/2007 | Macdonald et al. |
| 2007/0217491 | A1 | 9/2007 | Tzannes |
| 2008/0062872 | A1 | 3/2008 | Christiaens et al. |
| 2008/0228936 | A1 | 9/2008 | Schmid et al. |
| 2009/0138775 | A1 | 5/2009 | Christiaens et al. |
| 2010/0031108 | A1 | 2/2010 | Peeters et al. |
| 2011/0314350 | A1 | 12/2011 | Christiaens et al. |

OTHER PUBLICATIONS

Stephen B. Wicker, "High-Reliability Data Transfer Over the Land Mobile Radio Channel Using Interleaved Hybrid-ARQ Error Control," IEEE Transactions on Vehicular Technology, vol. 39, No. 1, Feb. 1990, pp. 48-55.

Isaac Sofair, "Probability of Miscorrection for Reed-Solomon Codes," Proceedings, International Conference on Information Technology: Coding and Computing, 2000, pp. 398-401.

G.gen: A Hybrid PCTCM-ARQ Error Correction Scheme, ITU Telecommunication Standardization Sector, Temporary Document HC-52, Study Group 15, Canada, 2000, pp. 1-6.

Office Action mailed on Dec. 1, 2010 for U.S. Appl. No. 11/853,532, filed Sep. 11, 2007 (32 pages).

Office Action mailed on Oct. 11, 2011, in U.S. Appl. No. 11/853,532, filed Sep. 11, 2007 (42 pages).

Office Action mailed on Jul. 6, 2010, in U.S. Appl. No. 11/853,532, filed Sep. 11, 2007 (28 pages).

Office Action mailed on Jan. 6, 2010, in U.S. Appl. No. 11/853,532, filed Sep. 11, 2007 (21 pages).

Office Action mailed on Jul. 9, 2009, in U.S. Appl. No. 11/853,532, filed Sep. 11, 2007 (24 pages).

Office Action mailed on Nov. 3, 2011, in U.S. Appl. No. 13/168,468, filed Jun. 24, 2011 (8 pages).

Office Action mailed on Mar. 21, 2012, in U.S. Appl. No. 12/385,546, filed Apr. 10, 2009 (24 pages).

\* cited by examiner

SYSTEM FOR COMMUNICATING DATA IN XDSL USING DATA RETRANSMISSION

CROSS-REFERENCE TO RELATED APPLICATIONS

This application claims benefit of U.S. Provisional Application No. 60/907,833, filed Apr. 18, 2007, and U.S. Provisional Application No. 60/825,542, filed Sep. 13, 2006, all of which are incorporated by reference herein in its entirety.

FIELD OF THE INVENTION

Certain embodiments of the present invention relate to data communication. More specifically, certain embodiments of the invention relate to a method and system for communicating data in xDSL using data retransmission.

BACKGROUND OF THE INVENTION

As early as the first ADSL1 standard, recovery of transmission errors in xDSL relied upon using error correction codes such as, for example, Reed Solomon (RS), together with interleaving. In addition to providing impulse noise correction, the use of RS code provided extra coding gain, therefore improving the achievable data rate of the DSL system.

The evolution to ADSL2+ and VDSL2 standards did not question this strategy to fight impulse noise. However, the high data rate achieved together with extended impulse noise requirements forces the use of very small RS code words having many RS parity bytes. Accordingly, the RS net coding gain becomes highly negative, causing degradation in achievable bit rate.

Current DSL systems provide Impulse Noise Protection (INP) by means of Reed Solomon FEC associated with interleaving techniques. When a high INP is requested together with a small delay constraint (or limited available interleaving memory) this technique has some drawbacks such as the RS code words introducing a lot of overhead and consequently, the high INP protection is provided at a cost reduced bit rate (RS coding gain becomes negative), and if the system cannot correct the error, a lot of user data is impacted. Further, at low noise margins, the RS decoder capability is already stressed to correct residual stationary errors, thereby preventing the RS decoder from being fully available to correct impulse noise. It can be shown that with typical xDSL and RS decoder and interleaver settings, the impulse noise correction capability is practically nonexistent below approximately a 2 dB noise margin.

DETAILED DESCRIPTION OF THE INVENTION

Standard xDSL systems provide in their configuration management information base ("MIB") a parameter called minINP (minimum Impulse Noise Protection). MinINP defines the impulse noise length that the communication link should be able to sustain without error. The configuration MIB also defines a maximum transmission delay, maxDelay. Since a (N,R) Reed-Solomon (RS) code can correct up to R/2 errors, and since the interleaver spreads a codeword over at most maxDelay ms, standard xDSL systems can use an overhead rate equal to at least: $(R/2)/N >= minINP/maxDelay$, for example, with a typical value of minINP (500 us) and maxDelay (4 ms), R/N>25%.

A system that can achieve the requested minINP and maxDelay constraints while achieving a rate close to what it can achieve without impulse noise protection, i.e., without paying the associated high Reed-Solomon overhead rate cost, may use something other than RS code to achieve its impulse noise immunity. In accordance with the following disclosure, providing an error-free communication link in presence of an impulse noise of length almost equal to the maximum link delay may be achievable using the disclosed data retransmission scheme. While using retransmission may introduce jitter, an embodiment of the present invention may limit the introduced jitter in retransmission.

The following disclosure describes a method for handling data retransmission in an xDSL system. The method uses data retransmission while limiting as much as possible the modifications needed on existing systems. The method may be implemented, for instance, on existing xDSL CO (central office) and CPE (Customer Premises Equipment) chipset. The main principles of data retransmission are enabled when the CO keeps a copy of all data blocks it sends downstream, typically for period of 5 to 8 milliseconds. When the CPE detects a corrupted data block, it asks the CO to retransmit the concerned block.

In an embodiment, retransmission may provide an INP of at least 8 symbols, and it may allow the CPE to maximize the coding gain it can get from the usage of trellis combined with RS forward error correction (FEC). This is because RS overhead does not need to provide the INP, but can be solely selected to maximize the coding gain. Therefore, a minimal interleaving may be used to scatter the trellis errors prior to RS correction.

Figure 1A:
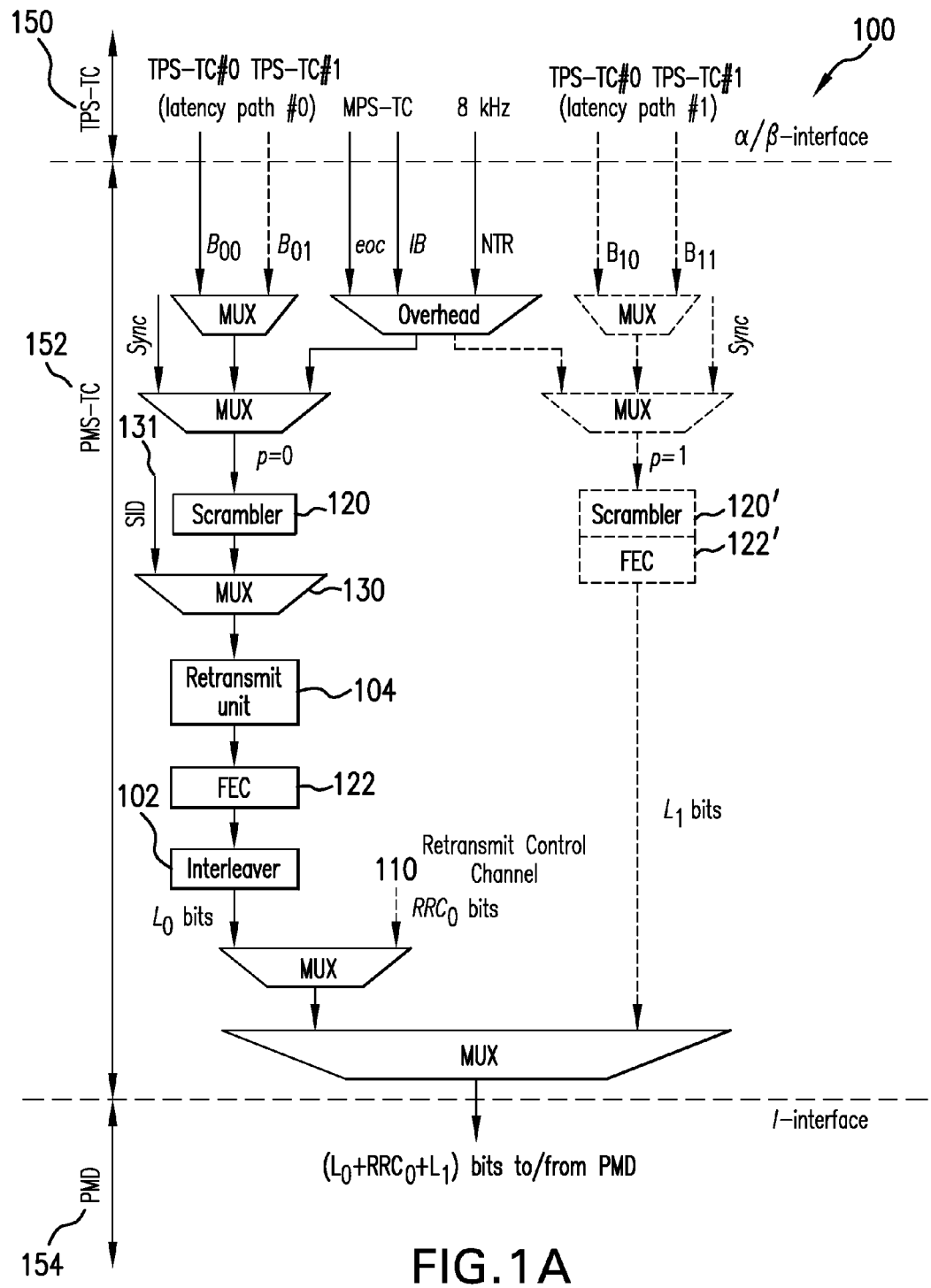
FIGS. 1A-C are block diagrams of an exemplary transmitter.

FIG. 1A is a block diagram of a portion of an exemplary transmitter 100. Three separate sublayers are illustrated as they may appear in an xDSL modem. The first sublayer 150 is the Transport Protocol Specific—Transmission Convergence ("TPS-TC") layer, the second sublayer 152 is the Physical Media Specific—Transmission Convergence ("PMS-TC") sublayer, and the third layer 154 is the Physical Media Dependent ("PMD") sublayer. One skilled in the art of xDSL communications will recognize the basic functions of these three sublayers and determine where they fit in a typical OSI-based communication stack. Further, xDSL transmitters and receivers having such sublayers for both CO and CPE applications are known in the art. Such examples include Broadcom Corporation's BCM6410/6420 BladeRunner™ ADSL2+ Central Office Chipset and BCM6348 Single-Chip ADSL2+ Customer Premise Equipment Chip.

In the configuration illustrated in FIG. 1A, the data retransmission system and method described herein may be implemented in the PMS-TC layer 152 as a new functional unit—i.e., as retransmit unit 104. One advantage to this approach is its implementation simplicity. Placing the retransmit unit 104 in the PMS-TC layer puts it closer to the PMD layer, which is where most errors take place. Further, such placement offers greater transparency with respect to existing performance monitoring functions. This specific embodiment is described in more detail herein.

Figure 1B:
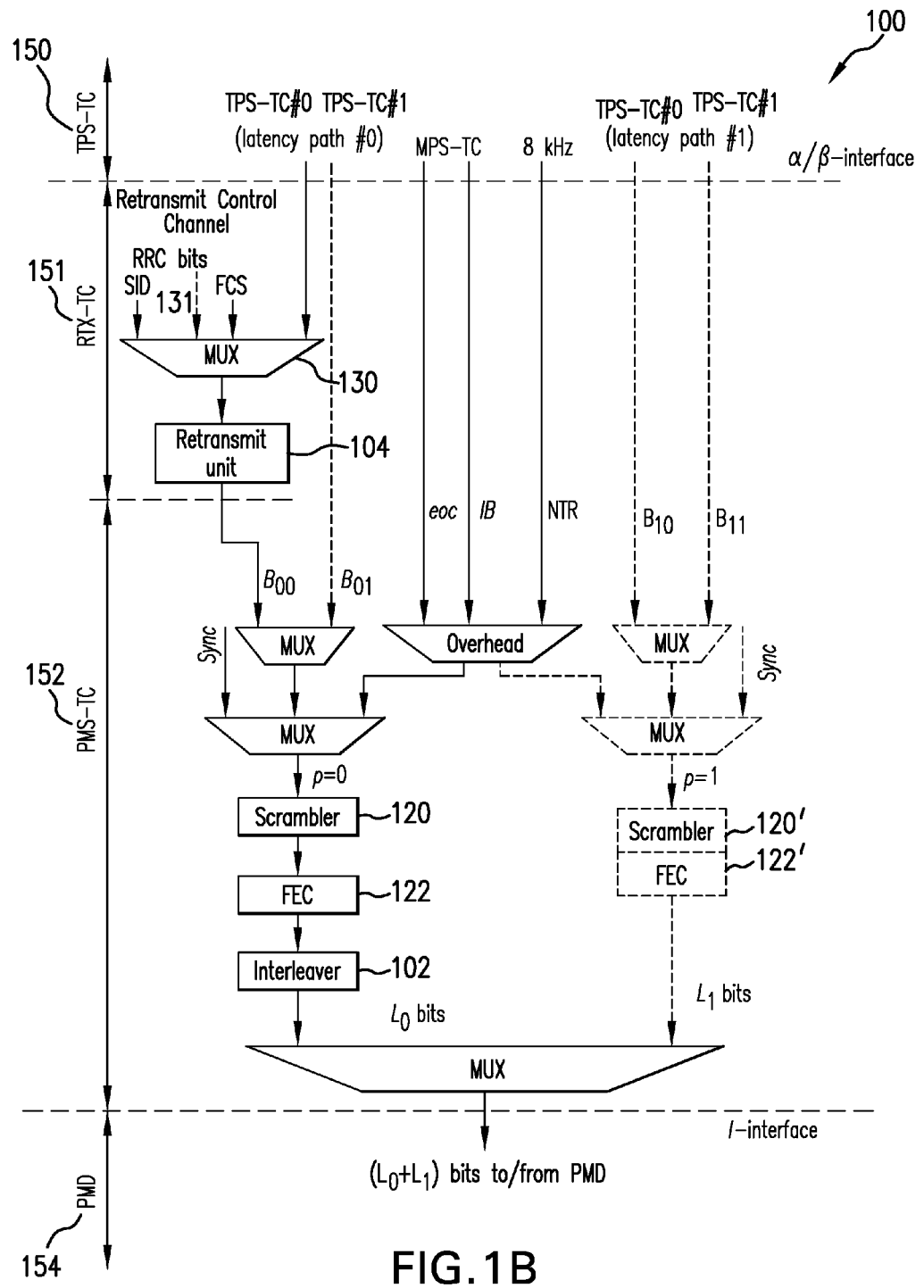
Figure 1C:
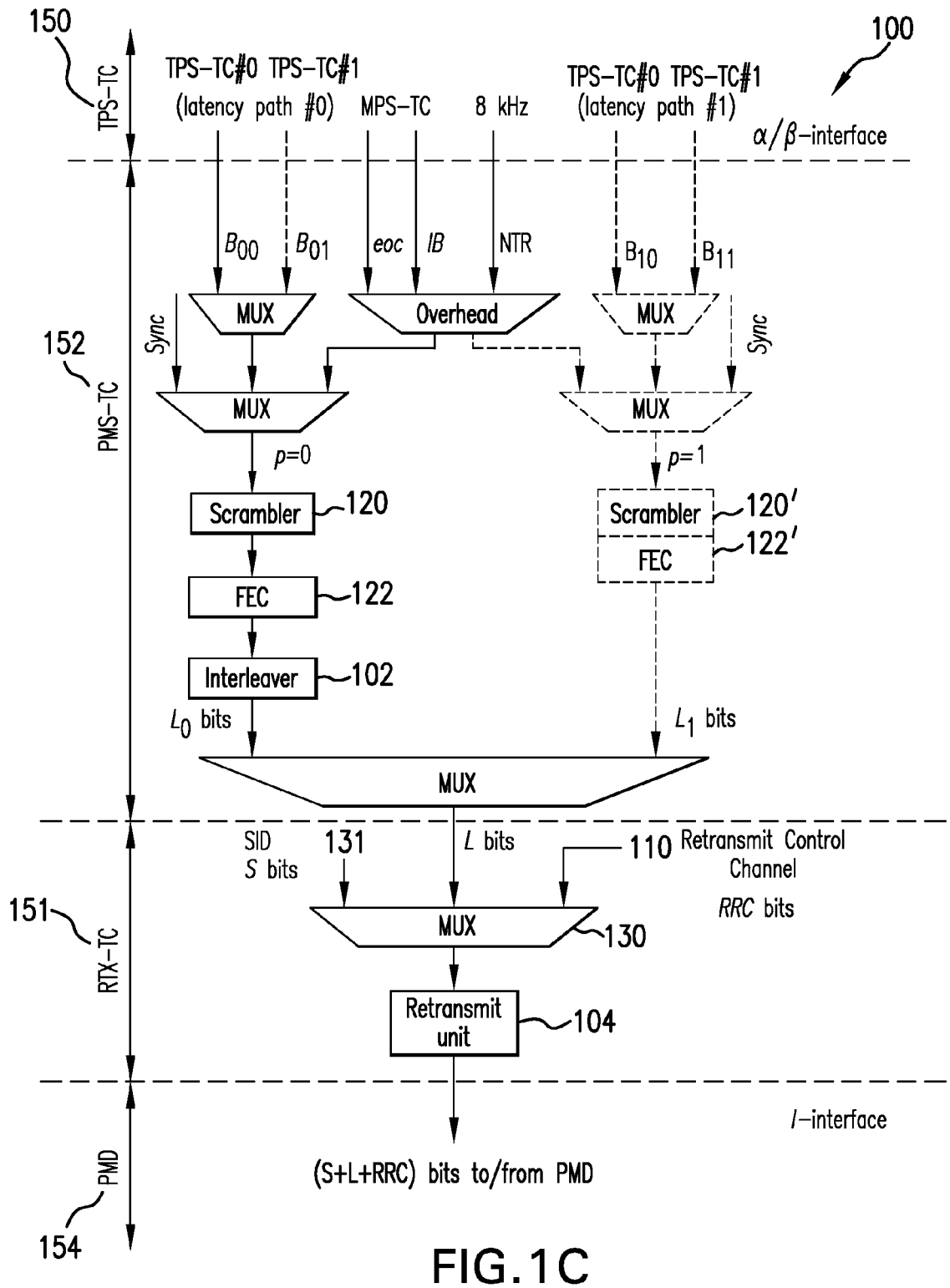

In alternate configurations illustrated in FIGS. 1B-C, a system and method could be defined that is compatible with placement of the retransmission unit 104 in different location. For instance, as illustrated in FIG. 1B, a retransmission transmission convergence (RTX-TC) layer 151 could be defined between the TPS-TC 150 and PMS-TC 152 sublayers without departing from the scope of the present disclosure. One advantage of this approach is that it leaves the existing frame structure unchanged. In yet another configuration illustrated in FIG. 1C, a system and method could be defined that is compatible with placement of the RTX-TC sublayer 151 between the PMS-TC 152 and PMD 154 sublayers. Most principles described herein are valid and applicable for these alternate solutions, and one of skill in the art would be able to modify the principles described herein accordingly.

According to the disclosed retransmission principles, a data block or data transmission unit (DTU) is defined. The previously transmitted DTUs may be temporarily stored at the CO. When it is determined that a DTU was corrupted during transmission, it may be retransmitted. One skilled in the art will recognize that the current xDSL standards define at least three types of TPS-TC (Transport Protocol Specific Transmission Convergence) functions: synchronous transfer mode (STM), asynchronous transfer mode (ATM), which is typically used on ADSL systems, and packet transfer mode (PTM), which is an ethernet and generic packet interface, which is typically used on VDSL systems. A data block or DTU may thus be defined as one or several RS code words, or something different such as a block of ATM cells, PTM cells or fragments, or 65 byte packets, for example.

The CO keeps a copy of all DTUs that it sends in downstream for a period of time. In an exemplary embodiment, the DTUs are kept for 5 milliseconds. The period of time should be sufficient to determine whether any of the sent DTUs were corrupted during transmission, and to request retransmission thereof. If the CPE detects a corrupted data block, it may send a signal to the CO requesting a retransmission of the corrupted data block.

The size of the data block or DTU may be defined as n=1/S code words, where the value of 1/S may be an integer. This causes the data block or DTU to exactly match the size of one discrete multi-tone (DMT) symbol. In case of a single corrupted DMT symbol, for example, this scheme may have the benefit of corrupting only one data block. However, this simplification is optional. If this simplification is adopted, the repeated data block may become a repeated DMT symbol. To overcome the possibility of having the same crest factor as a result of the repeated DMT symbol, a new scrambler or some other type of data randomization scheme may be utilized, for example.

Figure 2:
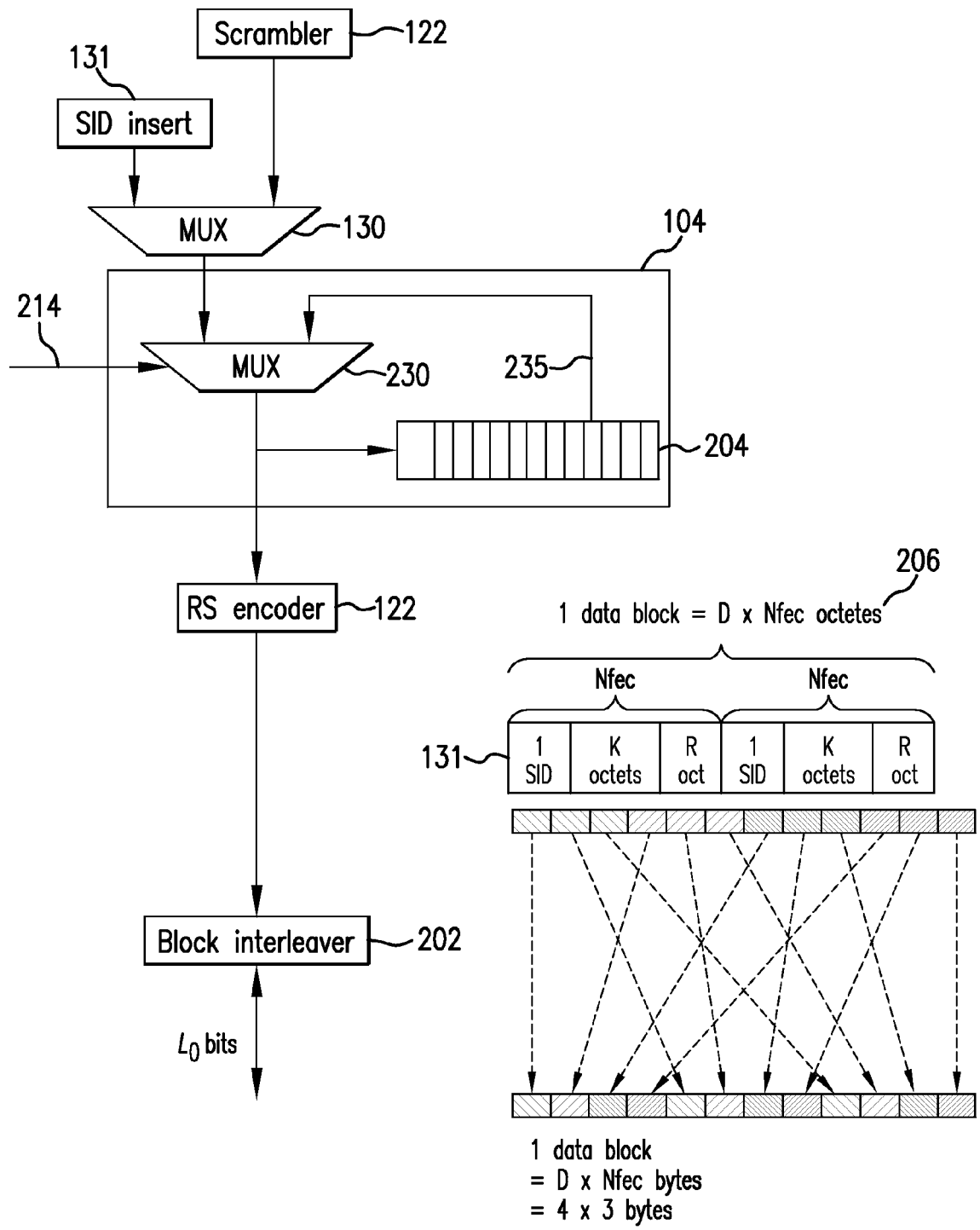
FIG. 2 is a block diagram of an exemplary retransmit unit and block interleaver operation.

Further simplification may be achieved by replacing the convolutional interleaver 102 by a block interleaver 202 (as illustrated in FIG. 2) over D symbols, i.e. an intra codeword interleaving scheme that may not cost any interleaving memory and does not introduce any extra transmission delay.

A retransmit container may be further defined to identify which corrupted DTUs need to be retransmitted, irrespective of the manner or degree to which the DUT was corrupted. In the disclosed retransmission scheme, the retransmit container is defined as a "data slot" or a "time slot" corresponding to a DTU. The retransmission container may be maintained at both the transmitter (Tx) and receiver (Rx) sides of the xDSL system. As long as the xDSL data rate is substantially identical at the Tx and Rx sides, the retransmit container index will be correct and synchronous at both sides. This is true even in presence of massive transmission errors.

The retransmit container index may thus be used to reliably identify the data blocks or DTUs that needs to be retransmitted. The data blocks or DTUs corresponding to the retransmit container may comprise n RS codewords. The parameter n may be nominally chosen close to, but lower than or equal to 1/S such that the corruption of one discrete multi-tone (DMT) symbol may only call for retransmission of 1 or 2 DTUs. Two consecutive containers may not contain two consecutive data blocks, such as in the case of retransmission where a container will contain a data block which has already been transmitted.

Every data block may also be uniquely identified by a sequence identification number (SID) 131. The SID 131 information may be repeated over n bytes, 1 byte being inserted inside each codeword, as the first byte of each codeword. The SIDs 131 may increment sequentially modulo a max count, significantly larger than the depth of the retransmission queue. A multiplexer 130 may be incorporated into PMS-TC layer 152 to handle addition of a SID 131 to the data blocks. The SID 131 may be added after the scrambler block 120, but before the forward error correction (FEC) block 122, as illustrated in FIG. 1. The data block or DTU may comprise a set of data bytes grouped together and identified by the SID. An exemplary data block or DTU 206 is illustrated in FIG. 2. The SID 131 increases with each new data block generated and is used to identify a new data block from a retransmitted one.

Referring again to FIG. 1, transmitter 100 may also comprise a convolutional interleaver 102. Interleaver 102 receives as input one (or several fractions of one) RS codeword and produces L0 bits per symbol. In a standard transmitter, at each symbol, the interleaver expects L0 bits from coming out of the forward error correction (FEC) block 122. FEC 122 could be, for example, a Reed-Solomon (RS) encoder.

A retransmission unit 104 handles the retransmission request. The retransmit unit 104 may also store and manage retransmit containers and the retransmit container index, which are used to identify transmitted and stored DTUs. It should be clear to one of skill in the art that retransmit unit 104 could alternatively be placed after the FEC 122, e.g., after a RS encoder. This functionally equivalent embodiment (not illustrated) highlights the fact that the retransmit queue 204 (illustrated in FIG. 2) could also store RS parity bytes. Such an embodiment could increase memory constraints but reduce computational load. Operation of retransmit unit 104 is described more fully below.

FIG. 2 is a block diagram of an exemplary retransmit unit 104. Retransmit unit 104 includes a multiplexer for receiving incoming data from multiplexer 130 and a retransmission request 214. Further, multiplexer 230 receives the data block or DTU to be retransmitted 235 from a retransmission buffer 204. As noted above, the DTU to be retransmitted 235 is identified by its retransmission container.

FIG. 2 also illustrates the operation of block interleaver 202. When operating in an exemplary block repetition mode, certain settings may be applied to the frame structure of exemplary data blocks 206. One setting may be to group D RS codewords together to form data block 206. Supported values for D may be, for example, 1, 2, 4 and 8 or more. The values Nfec and D may be selected by a receiver (not illustrated) such that the data block size is lower or equal to the discrete multi-tone (DMT) symbol size (L/8 bytes). These ranges are exemplary and not restrictive.

Another setting may be to include an overhead byte, the SID byte 131, in each RS codewords, prior to the first data byte. The SID byte 131 may provide the data block sequence ID, and may be, for example, an 8-bit wrap around counter starting at 0 and incremented each time a new data block 206 is generated. The same SID byte 131 may be included in each RS codeword part of the same data block.

Another setting may be to store the data block or DTU inside a retransmit unit. The retransmit unit output is a retransmit container (described above) that contains either the last data block it has received, or one of the previous data blocks it had stored. The output data block may be cyclically rotated inside the retransmit container by a byte offset equal to the retransmit container counter modulo 256. The retransmit container counter is incremented each time a new retransmit container is sent. Such cyclic rotation is optional, and may occur when the DTU size matches exactly the DMT symbol size.

Another setting may be replacing the convolutional interleaver 102 by a block interleaver 202, acting over one DTU or data block. The interleaving depth D may be set equal to the number of RS CW inside a DTU. Byte Bj with j=0 . . . Nfec*D−1 may be output by the interleaver at index k=mod (j,Nfec)*D+floor(j/Nfec).

Yet another setting may be to use a "retransmit control channel" 110 to send and receive retransmit requests. The retransmit control channel 110 may be, for example, a fixed rate channel of 3 bytes/symbols, for example, multiplexed at the gamma interface as an implicit extra latency path $LP_{i+1}=LP_{RCC}$ with $L_{RCC}=24$, pre-pended before the L1+L0 bytes of the data paths. The retransmit control channel 110 may be present in one direction if the block retransmission mode is enabled in the reverse direction, as illustrated in FIG. 1. In one embodiment using ADSL, a channel of two bytes per symbol may be used. In another embodiment using VDSL, three bytes may be used.

The number of FEC parity bytes R and codeword length N may be selected such as to insure a reliable detection of uncorrectable codewords by the RS decoder. For instance, with R=16 and N<=232 it can be computed that uncorrectable codewords will go undetected with a probability lower than $10^{-5}$. This effectively may be translated to 1 error out of $10^5$ could go undetected and assuming 10 errors per seconds, this is one undetected error every 2 hours. Lower residual undetected uncorrected codeword rate may be achieved by either increasing R, lowering N, or by only allowing the RS decoder to correct less than R/2 errors. The parameters R and D may be selected such that a trellis decoder error burst can be corrected. Since such a burst may typically span 10 tones, a correction capability larger than (typically) 10*12 bits/tone=15 bytes may be utilized. For example, with D=4, R>=8. Alternatively, the RS code may be selected such as to only provide error detection. In this case, which may be of interest at a low bit rate, R=2 or 4 may be selected.

Based on the information received from the customer premise equipment (CPE), the retransmit unit 104 may decide whether it should take a new data block from the RS encoder or whether it should retransmit a data block from its own retransmission buffer 204. Note that if retransmission is applied in the downstream direction, as described here, the receiver is associated with the CPE and the transmitter with the central office (CO). The reverse convention would be used if retransmission is applied in the upstream direction.

For retransmission in the downstream direction, retransmit unit 104 keeps track of which data block 206 has been sent in which retransmit container using a retransmit index. A request to retransmit a given container may be accepted once by the transmitter 100. However a same data block or DTU may be retransmitted several times inside different retransmission containers. The transmitter 100 keeps track of the time at which it has sent a given DTU or data block for the first time, and will not accept retransmission of a retransmission container that contains a data block that is older than a given threshold. This threshold may be configured as being equal to the MIB maximum delay parameter.

At the receiving end, a receiver may de-interleave the transmitted data, and verify and correct the RS codewords present in the data block transported by the retransmit container. The receiver may also verify the correctness of the SID present in the retransmit container. At that point, the receiver may have information regarding whether one of the codewords may be uncorrectable and whether the SID may have been corrupted during the transmission. Based on these two indications, the receiver may decide what to do with the received RS codeword. Some possible actions that the receiver may take are: drop the data block; send a retransmit request to the CO for the container just received; replace a data block already present in the receive buffer FIFO 304 (see FIGS. 3A and 3B), by a newly arrived one; and push the data block in the receive buffer FIFO 304 and simultaneously take a data block out of the receive buffer FIFO 304 and continue the normal deframing processing with the RS codewords present in that data block.

The receive buffer FIFO 304 may be a FIFO of m received data blocks, and should be long enough to allow reception of a retransmission before the data block leaves the FIFO. For each data block or DTU present in the receive buffer FIFO 304, the FIFO may be capable of determining whether it contains errors or not. At initialization time, the receive buffer FIFO may be full of correct dummy data blocks. The deframer (not shown) may therefore not use the first m data blocks that go out of the receive buffer FIFO 304.

Retransmit Request

Any retransmission scheme relies on a feedback from a receiver. This feedback must be highly reliable. In an embodiment, the transmitter receives a retransmission request 214 from the receiver. Retransmission requests 214 could have different characteristics. For example, it is desirable to have redundancy in the request. As such, notice that a DTU has to be retransmitted is preferably contained in multiple requests such that if some requests get lost, there is still a possibility to receive the retransmission notice. Further, the retransmission request 214 preferably requires as small a bitrate as possible in order to minimize overhead (e.g., 2 or 3 bytes per symbol in various embodiments). Therefore, the format should be dense and the request should contain as much information as possible. In other words, best use should be made of available overhead. Still further, the information contained in retransmission request 214 should be understandable and meaningful independently of the history. In other words, the retransmission request is preferably self meaningful and not dependent on any previously transmitted request. Finally, the retransmission request 214 should be protected by some kind of error check, such as a check sum, so that the receiver can discriminate between correct and erroneous requests with a high reliability.

When sending a retransmission request 214, the retransmission signal may indicate the retransmit container ID, the last container ID to be retransmitted, and the number of containers to be retransmitted after that container. The signal may also comprise the last received container ID, and a bitmap indicating which container need to be retransmitted. For example, if the last container ID is Cid, bit I of the bitmap then is set to 1 if Cid-I needs to be retransmitted.

Exemplary data structures for an uncompressed retransmission request format could include {FCS, statusBitmap, lastContainerIdx}. For example:

lastContainerIdx: this provides the 'time stamp' of the receiver. Using this field the transmitter knows what range of its retransmit FIFO queue has already been received and is concerned by the statusBitmap. In an embodiment, the lastContainerIdx only contains the few LSB's of the index. Indeed, the MSB can easily be reconstructed by the transmitter, knowing that the roundtrip delay is approximately constant.

statusBitmap: one bit for each of the last n received container. LSB carry the status of the container lastContainerIdx, bit i carry the status of container lastContainerIdx-i. Alternatively, instead of carrying 1 bit per container, the information can be compressed in several different ways. One way is to count the trailing zeros of the uncompressed status, i.e. sent the number of consecutive wrong containers received, starting from lastContainerIdx and counting backward.

FCS: checksum to validate the correctness of the request

Upon receiving data, the DTU or data block may be checked for errors and different actions may be taken based on whether or not errors are present in the data block. If there is an unrecoverable error in one of the RS codeword or in the received SID, the data block may be pushed as being the next expected data block (tail of the FIFO), and the data block may be marked in the queue as being erroneous. If the receive buffer FIFO 304 contains at least one correct data block, a retransmit request may be sent to the CO. If, however, the receive buffer FIFO 304 only contains wrong data blocks, there may be high chance that a retransmission may not occur on time, and consequently, the retransmission may be disabled until the receive buffer FIFO 304 is again partially filled with correct DTUs. Upon examining the data, it may be determined that there are no residual errors in DTU. In this case, the SID is equal the next expected SID. Consequently, the data block may be pushed in the receive buffer FIFO 304 and marked as being correct.

In another situation, upon examining the data, it may be determined that the SID may not be the expected one and retransmission may be needed. If the SID does not match an index in the receive buffer FIFO 304, the DTU may be dropped if there is no correct data block in the FIFO. This may effectively result in recovering a potentially lost synchronization in case of long period with errors. The received codeword may be dropped until synchronization is achieved again. When repetition is handled at the TPS-TC level, resynchronization may not be needed and the received data block may be immediately pushed inside the receive buffer FIFO 304. However, if there are some correct data blocks in the FIFO, the received data block may be pushed at the beginning of the queue, and marked as being wrong, without asking for retransmit.

Alternatively, if it is determined that the SID is not be the expected one and retransmission may be needed. If a correct data block is already present in the FIFO at the location corresponding the to the received data block, it may be concluded that a data block for which retransmission was not requested may have been received. This data block may be pushed at the beginning of the FIFO and marked as being wrong. Still further, if it is determined that the SID may not be the expected one and retransmission may be needed, if the data block present in the FIFO at the location corresponding to the received data block is marked as being wrong, it may be replaced and marked as correct.

In embodiments, support for the retransmission scheme in addition to the standard interleaving mode may be negotiated during handshake in the communication system. Once established, in the CLR and CL messages, the CPE and CO may respectively announce support for this mode in the Rx direction, support for this mode in the Tx direction, their own worst case half-way roundtrip delay, and the maximum size of the repetition FIFO at the transmitter side.

The Retransmission Control Channel 110 illustrated in FIG. 1 may carry one retransmission request every symbol. The format of the retransmission request may be as follows: a portion of the most recent retransmit container index that has been received (for example the 4 LSBs); the number of containers without errors received since the last container without errors; the number of retransmit containers that must be repeated; and a message checksum.

Figure 3A:
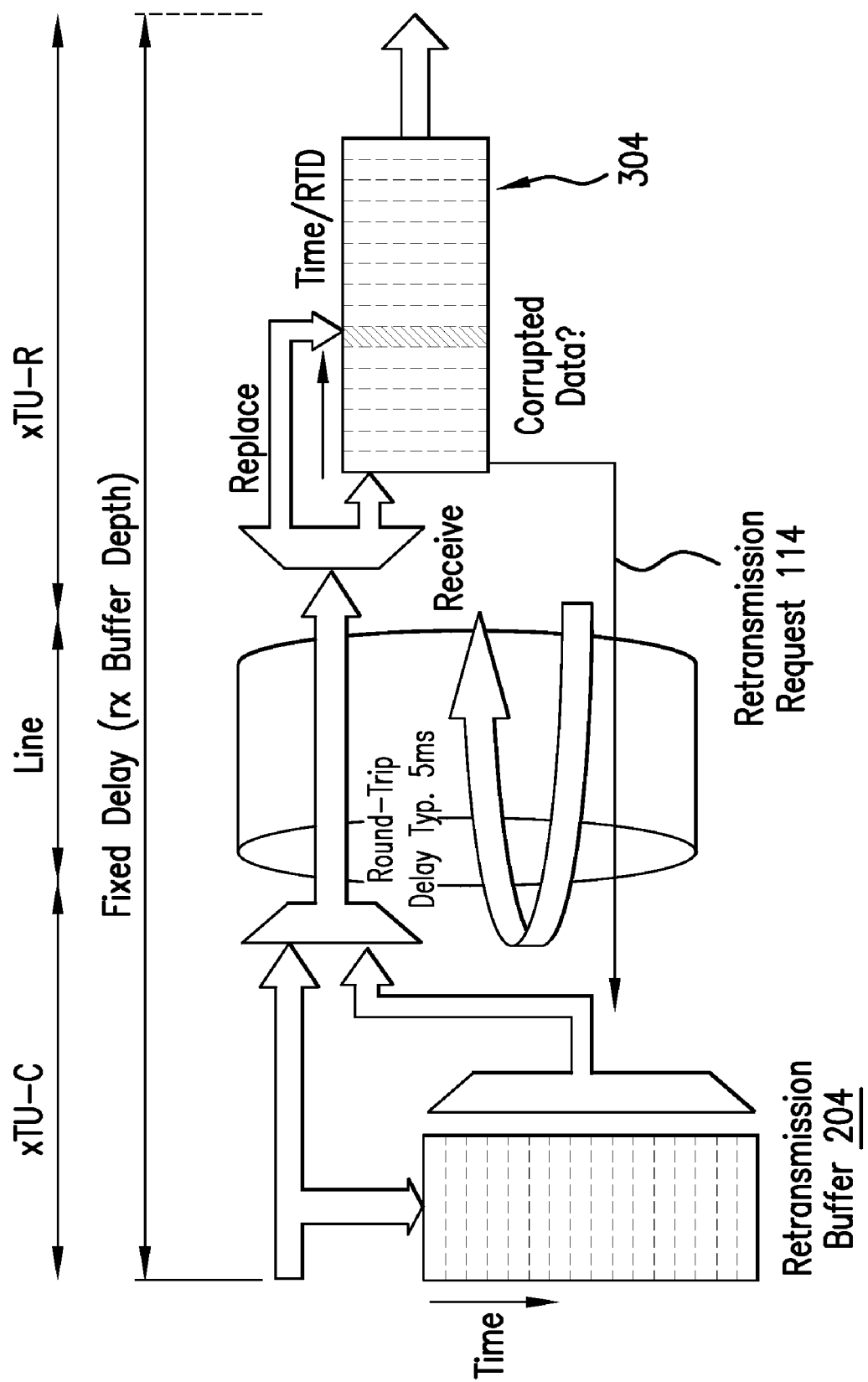
FIGS. 3A and 3B are block diagrams of an exemplary retransmission schemes.
Figure 3B:
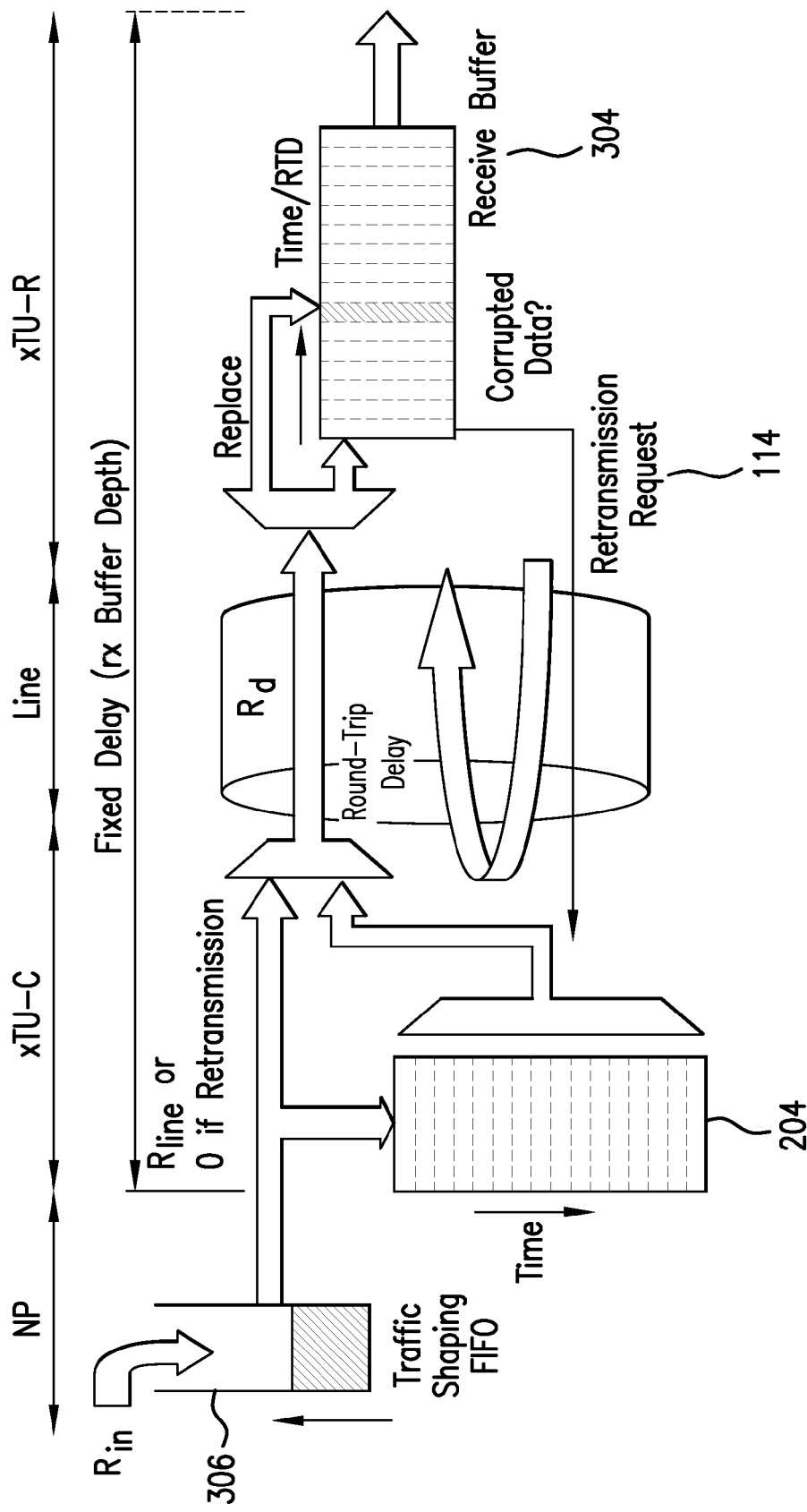

Further embodiments and principles of the above described transmission scheme are be further illustrated in the diagrams of FIGS. 3A and 3B. The general principle for an end-to-end retransmission scheme is depicted in FIG. 3A. All the transmitted DTUs are stored in a retransmission buffer 204 at the transmitter side. Upon reception of a DTU, its frame check sequence (FCS) is checked and a retransmission request is immediately launched if it is found corrupted. Even if corrupted, the DTU is pushed in the receive buffer 304. If the retransmitted DTU arrives while the corrupted one is still present in the receive buffer 304, the corrupted one is replaced. If the retransmitted data unit doesn't arrive on time, the corrupted data will be further processed by the receiver data path.

In more detail, the basic transmit mechanism is as follows ($W_{ret}$ denotes the retransmission window size in DTU). If no retransmission is pending, new data bytes are stored in a new DTU, and the DTU is transmitted over line as well as stored in the retransmission buffer 204. If, however, a retransmission is requested, two cases are possible. In one case, the first transmission of the requested DTU took place less than $W_{ret}*T_{DTU}$ second before the current time. In that case, the DTU is retransmitted. In a second case, the first transmission of the requested DTU took place more than $W_{ret}*T_{DTU}$ second before the current time. In that case, the request is discarded and a new DTU is transmitted.

Figure 4:
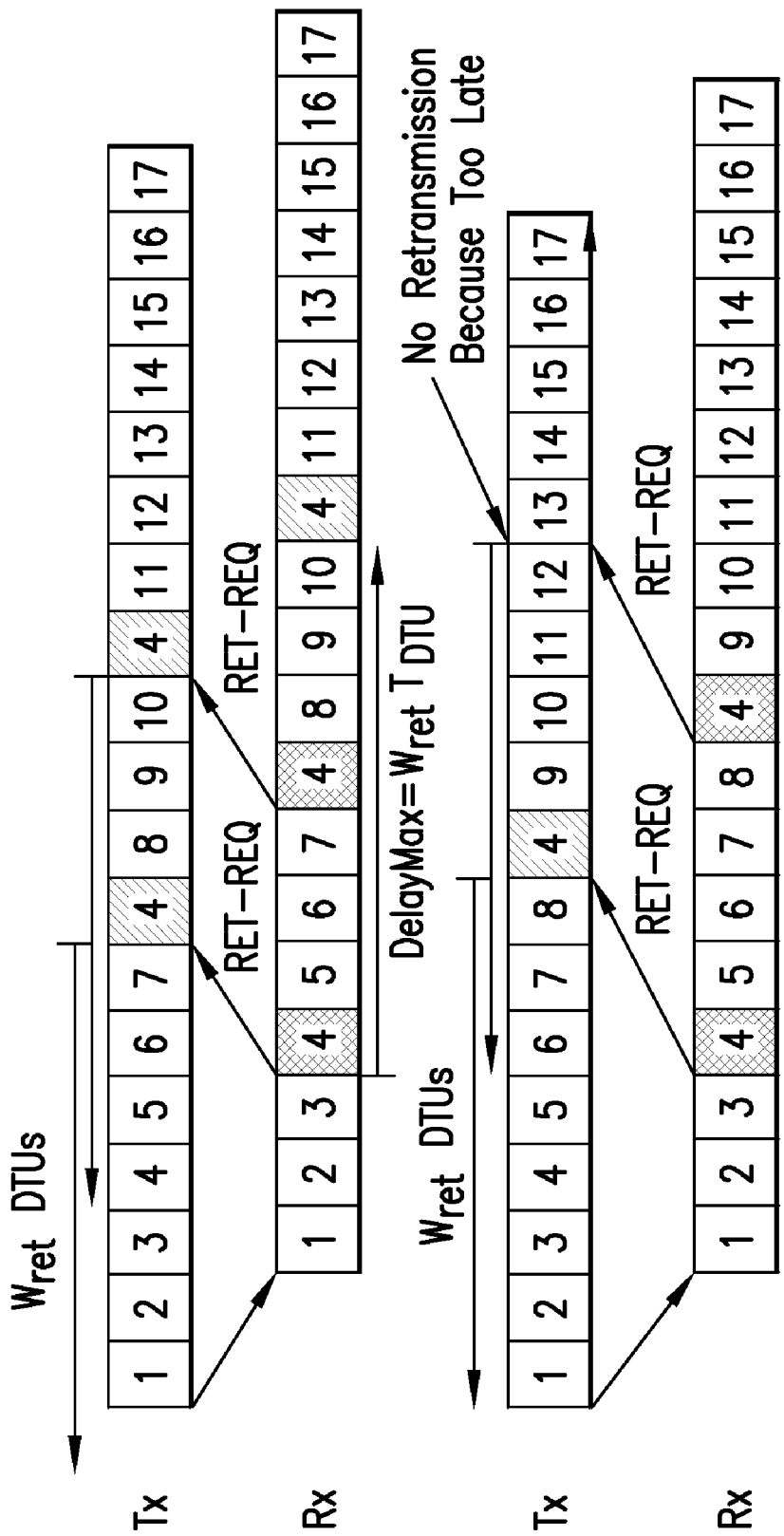
FIG. 4 illustrates a basic transmit mechanism.

Two examples of this mechanism are depicted in FIG. 4. In both cases $W_{ret}$ is equal to 8 DTUS. In the upper example, the round trip delay is equal to 4 $T_{DTU}$. The DTU #4 is corrupted a first time, and a retransmit is requested. As the first retransmit is requested 4 $T_{DTU}$ after the first transmission, the retransmission occurs. The same DTU #4 is again corrupted and a second request is sent back. The second request is received less (or equal) than 8 DTUs before the first request, so a second retransmit occurs and the DTU #4 is received with a delay of 8 DTUS.

In the lower example of FIG. 4, also two transmissions of DTU #4 are corrupted but this time the round trip delay is 5·$T_{DTU}$. As the second request arrives more than 8 DTUs after the first transmission, the request is discarded and the DTU #4 is never transmitted, i.e. an error happens on the line. As the receiver knows that after 8 DTU, there is no chance to receive the DTU #4, the DTU #5 will be blocked in the rescheduling queue no more than 8 $T_{DTU}$.

An alternate end-to-end retransmission scheme is described in FIG. 3B. Therein a rate adaptation FIFO 306 has been added to model the network processor at the input of the digital subscriber line physical layer. Assuming that the transmission rate of the DTU (equivalent to the net bearer rate) is $R_d$ and the rate of the guaranteed service is $R_{in}$, the exemplary principle is as follows: every transmission of a new DTU, $R_{in} \cdot T_{DTU}$ bits enter the rate adaptation FIFO 306 and at most $R_d \cdot T_{DTU}$ bits leave the rate adaptation FIFO 306. If the rate adaptation FIFO 306 contains less than $R_d \cdot T_{DTU}$ bits, the missing bits, as the DTU always contains $R_d \cdot T_{DTU}$ bits, are added by the rate adaptation process of the TPS-TC, through idle cell insertion in ATM or idle bytes insertion in PTM. Note that this process is statistical and follows the rate adaptation rules of the ATM or PTM TPS-TC. In the described embodiment, every retransmit of a DTU, $R_{in} \cdot T_{DTU}$ bits enter the rate adaptation FIFO and no bits leave the rate adaptation FIFO 306.

As noted above, in some embodiments, the retransmission may be controlled between TPS-TC and PMS-TC. As a new 'retransmission layer,' the data block may be defined as a group of ATM cells, PTM cells or fragments, or 65 bytes packet, for example. This approach leaves the existing frame structure unchanged. Additionally, using this approach may call for providing a new protection scheme on the data blocks, i.e., new CRC.

Exemplary Methods

Figure 5:
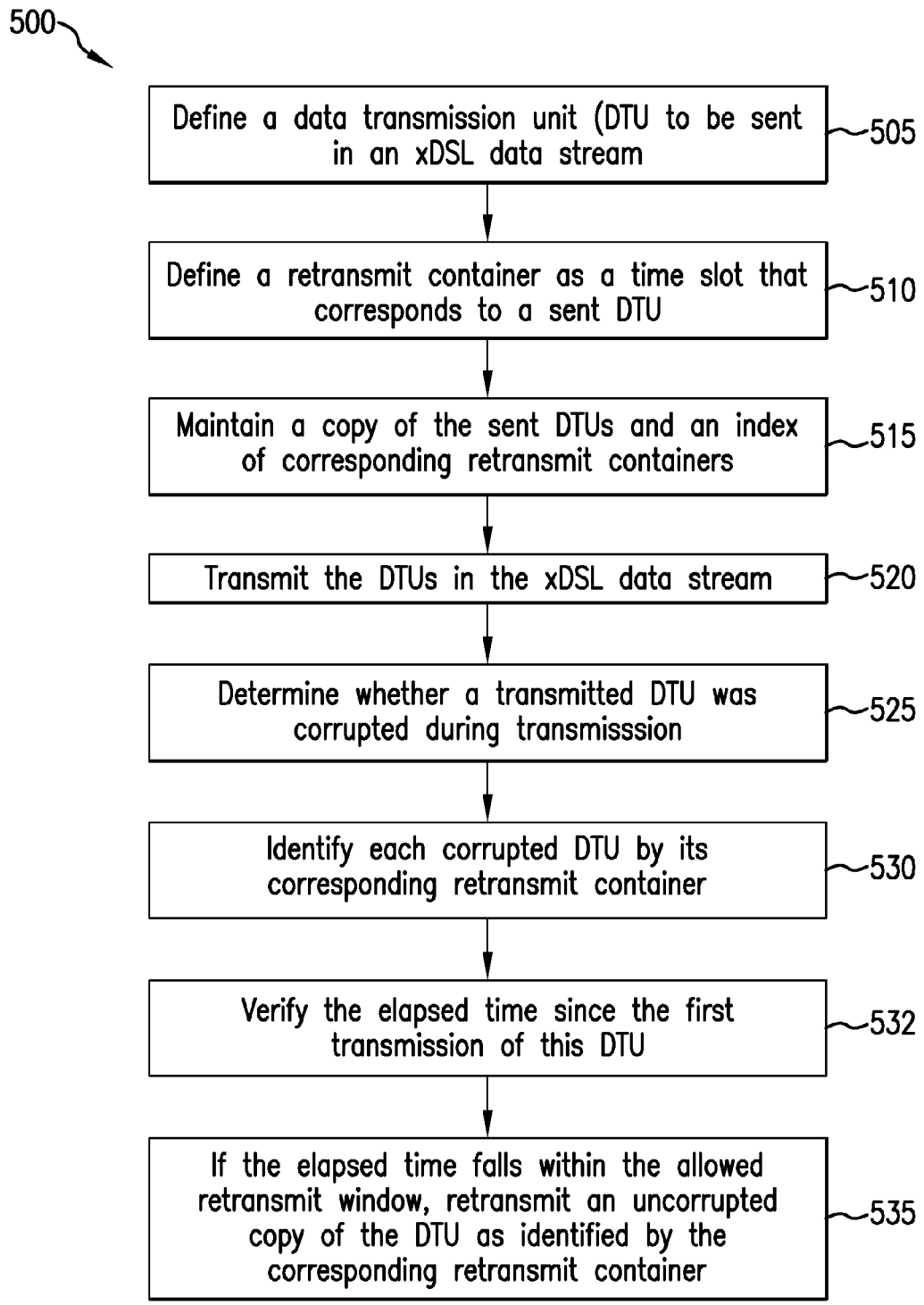
FIG. 5 is a flow chart illustrating an exemplary transmitter method.

A method for communicating data 500 is described in FIG. 5. The method 500 illustrated in FIG. 5 is performed from the standpoint of the transmitter, which could be located, for example, at a central office facility. According to step 505, a data transmission unit (DTU) is defined. In an embodiment, the DTU is sent in an xDSL data stream. As described above, a data block or DTU may defined as one or several RS code words, or something different such as a block of ATM cells, PTM cells or fragments, or 65 bytes packets, for example.

According to step 510, retransmit container is further defined as a time slot or data slot that corresponds to one sent DTU. Retransmission containers may be identified using an always-increasing index, starting from 0 at initialization time. As illustrated in step 515, the retransmission container index is maintained at the transmitter along with corresponding copies of the sent DTUs and possibly with a time stamp identifying the moment of the first transmission of that DTU. As long as the xDSL data rate is substantially identical at the Tx and Rx sides, the retransmit container index will be correct and synchronous at both sides. This is true even in presence of massive transmission errors. The retransmit container index may thus be used to reliably identify the data block or DTU that needs to be retransmitted.

According to step 520, the DTUs are transmitted in an xDSL data stream. The transmitter then determines, according to step 525, whether a transmitted DTU was corrupted during transmission. There are at least two ways by which a transmitter may determine whether a DTU was corrupted during transmission. In one embodiment, a retransmission request may be received requesting retransmission of an uncorrupted copy of the corrupted DTU. In such an embodiment, according to step 530, the uncorrupted copy of the DTU is identified in the retransmission request by its corresponding retransmit container. The retransmission request may be received in the reverse direction over a retransmit control channel, and the uncorrupted copy of the DTU may be returned instead of a new one in the downstream (in case of a CO transmitter) direction.

In an alternate embodiment, an acknowledgement may be expected for each validly transmitted DTU. If an acknowledgement is not received, it may be assumed that the DTU was not validly received and may have been corrupted. In that case, the transmitter may generate its own retransmission request. Again, according to step 530, the retransmission request may identify the unacknowledged DTU by its corresponding retransmit container. In yet another embodiment, both methods may be used together to enhance reliability that a corrupted DTU will be identified such that it may be retransmitted, and to optimize the delay before which the retransmission takes place.

Once the retransmission request is processed, and the corresponding DTU has been identified by its retransmit container, the elapsed time since the first transmission of this DTU is verified according to step 532. In an embodiment, if the elapsed time falls within the allowed retransmit window, an uncorrupted copy of the DTU is retransmitted according to step 535.

Figure 6:
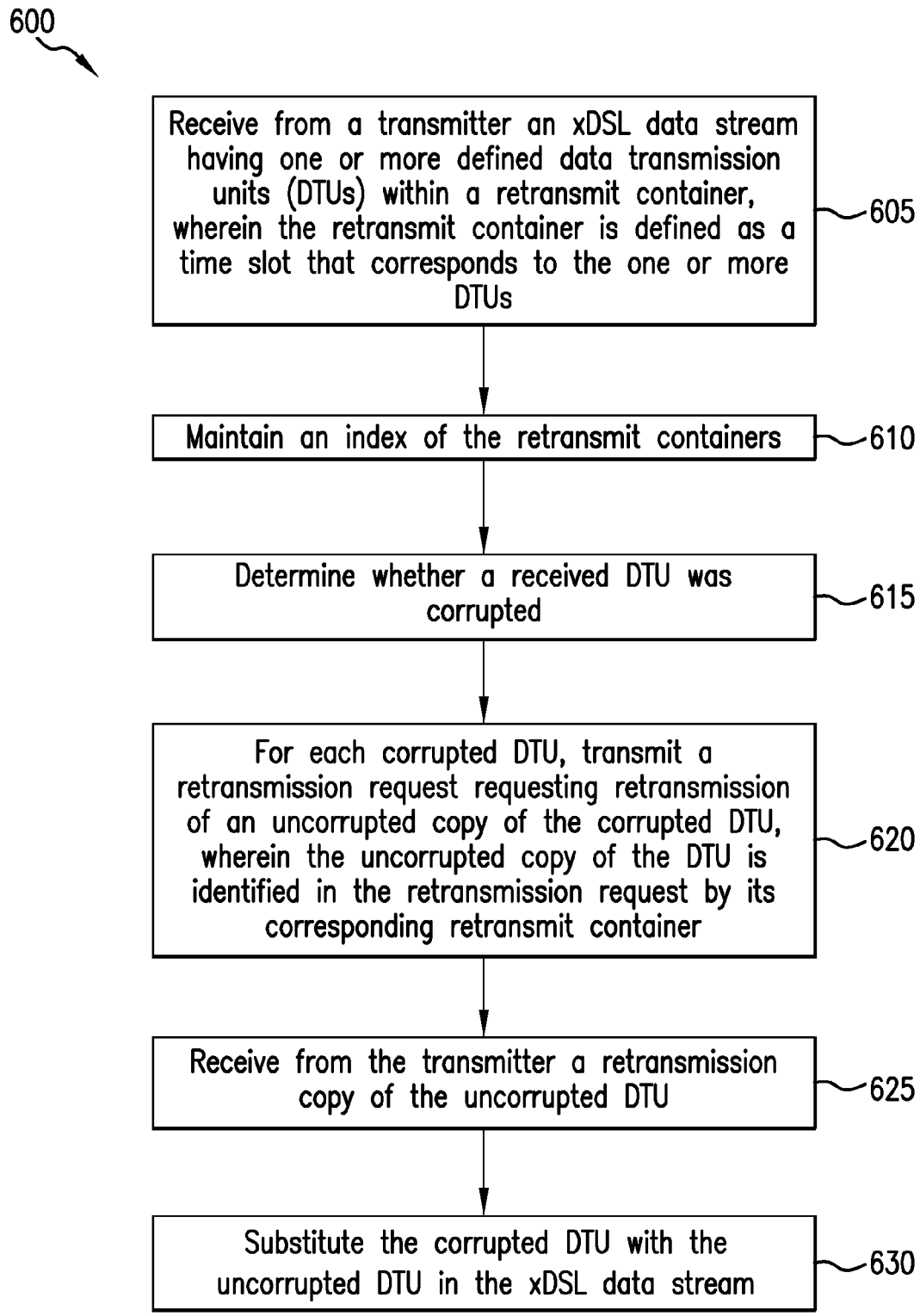
FIG. 6 is a flow chart illustrating an exemplary receiver method.

A method for communicating data 600 is described in FIG. 6. The method 600 illustrated in FIG. 6 is performed from the standpoint of the receiver, which could be located, for example, at the customer premise equipment (CPE). According to step 605, an xDSL data stream having defined data transmission units (DTUs) are received from a transmitter within retransmit containers. The retransmit container is defined as a time slot that corresponds to one received DTU. According to step 610, an index of the retransmit containers is maintained.

Next, according to step 615, the receiver determines whether a received DTU was corrupted. Various error checking schemes are well known in the art. According to step 620, for each corrupted DTU, a retransmission request is transmitted that requests retransmission of an uncorrupted copy of the corrupted DTU, or alternatively for each received DTU, a positive or negative acknowledgement is transmitted that lets the transmitter know which DTU needs to be retransmitted. The uncorrupted copy of the DTU is identified in the retransmission request by its corresponding retransmit container The retransmission request will be processed at the corresponding transmitter, and the receiver will then receive from the transmitter a retransmitted copy of the uncorrupted DTU, according to step 625. As a final step 630, the corrupted DTU substituted with the uncorrupted DTU in the xDSL data stream. As described above, a retransmission buffer is used for this purpose.

Control Parameters

Based on the retransmission model with rate adaptation queue, we can derive three high level parameters:

- The delay in ms equal to $(N_{ret}+W_{ret}) \cdot T_{DTU}$. Note that the delay may be split in the delay due to the resequencing of the retransmissions, $W_{ret} \cdot T_{DTU}$ and the delay due to the retransmissions of the DTU, $N_{ret} \cdot T_{DTU}$.
- The impulse noise protection (INP) equal to $N_{ret} \cdot T_{DTU}/T_s$ in DMT symbol with $T_s$ the symbol duration (e.g. 250 us).
- The supported minimum interarrival (IA) between two worst case impulses, $(N_{ret}+N_{int}) \cdot T_{DTU}$.

Bounds on these parameters, i.e DelayMax, INPmin, and IAmin, provides full control of the retransmission scheme by the operator. In an embodiment, DelayMax provides a bound on the delay as for the interleaver. Note that the delayMax configured should be greater than the round trip delay. INPmin provides a bound on the impulse noise protection. IAmin provides the minimum guaranteed rate, $R_{in}=(IAmin-INPmin \cdot T_s)/IAmin \cdot R_d$.

The particular end-to-end data transfer behavior in presence of retransmission needs new control parameters to provide guaranteed and predictable performances, both in term of available user data rate and jitter. In an exemplary embodiment, the following parameters may be used to this end and they are typically configurable independently per line and per direction:

maxDelay (expressed in ms)—This parameter (already used in case of normal interleaving) defines the maximum allowed nominal delay. It is used by the modem to set an upper bound on the allowed receiver retransmission queue size. Since it must be at least equal to the roundtrip delay, retransmission cannot be activated if the maxDelay configured is lower than 4 ms.

minimumRate (expressed in kb/s)—This parameter (already used in case of normal interleaving) defines the minimum guaranteed user data rate. The available bandwidth for retransmission is equal to the difference between the current data rate on the line and the minimum rate configured.

INPmin (expressed in 10th of symbol)—This parameter (already used in case of normal interleaving) defines the minimal guaranteed impulse noise protection, provided that the available data bandwidth allowed for retransmissions is not exceeded.

INPmax (expressed in 10th of symbol)—This parameter defines the maximum number of consecutive retransmissions that may take place and therefore bounds the maximal jitter due to retransmissions. A default value of zero doesn't bound the number of consecutive retransmissions (that will however never exceed maxDelay*4 symbols).

minRtxRatio (expressed in 1/256th, relative to the minimum data rate)—This parameter allows to provision a minimal guaranteed retransmission bandwidth, on top of the minimum rate. In case of repetitive impulses of known maximal length and periodicity, this parameter can be used to guarantee that the repetitive impulse noise can be corrected. A default value of zero doesn't force any extra guaranteed data bandwidth for retransmissions.

minRSoverhead (expressed in 1/256th)—This new parameter allows to forces a minimum amount of RS overhead (R/N). This can be used to guarantee a given amount of steady state error correction capability. A default value of zero doesn't force the use of RS overhead.

In an embodiment using VDSL2, when the standard interleaving scheme is used, a common interleaving memory is dynamically split between an upstream (US) and (DS) directions. In a similar way, when the retransmission scheme is enabled, the retransmission memory is split between US and DS direction. In both cases, this split is performed in such way that the ratio of US and DS rate matches a given ratio configured independently for each line.

Performance for a Specific Embodiment

Based on the previous model, the performances of an interleaver and a repetition scheme in a typical VDSL2 configuration were compared. A VDSL2 system with a symbol duration $T_s$=250 us, a roundtrip delay of 5 ms, an interleaver memory of 65536 bytes or a retransmission queue of 32768 bytes (assuming that the interleaver memory may be reused for retransmission) and a DTU duration $T_{DTU}$=260 us was used.

The minimal number of consecutive retransmissions to achieve the INPmin is equal to $$N_{ret} = \left\lceil \frac{INP_{min} \cdot T_s}{T_{DTU}} \right\rceil$$

The minimal number of DTU in the retransmission queue to handle both the roundtrip delay and the number of consecutive retransmissions is equal to:

$$W_{ret} = \text{MAX}\left(\left\lceil \frac{\text{roundtrip}}{T_{DTU}} \right\rceil, N_{ret}\right)$$

The maximal transmission rate of the DTU (equivalent to the bearer rate) is equal to:

$$R_d = \frac{RetFIFOSize}{W_{ret} \cdot T_{TDU}}$$

The ratio between the guaranteed transmission rate and the maximal transmission rate of the DTU $$\frac{R_{in}}{R_d} = \frac{N_{int}}{N_{int} + N_{ret}} = 1 - \frac{N_{ret}}{\left\lceil \frac{IA_{min}}{T_{DTU}} \right\rceil}$$

Based on these formulae, the maximal transmission rate of the DTUs, the total delay, and the split between the delay incurred in the rate adaptation FIFO and the retransmission rescheduling queue, are derived for different INPmin in the table 1. The ratio between the guaranteed rate and the net rate is reported in table 2. As a comparison with an interleaver scheme, the maximal rate with the standard parameters of the profile 8a was derived for equivalent INPmin and MaxDelay. The results are illustrated, including the overhead of the Reed-Solomon in the table 3.

TABLE 1

Maximum bearer rate for different INPmin

| INPmin | $N_{ret}$ | $W_{ret}$ | Delay Resequencing (ms) | Delay rate-adaptation FIFO (ms) | Total Delay (ms) | Max $R_d$ (Mbps) |
|---|---|---|---|---|---|---|
| 1 | 1 | 20 | 5.2 | 0.26 | 5.46 | 50.4123 |
| 2 | 2 | 20 | 5.2 | 0.52 | 5.72 | 50.413 |
| 4 | 4 | 20 | 5.2 | 1.04 | 6.24 | 50.413 |
| 8 | 8 | 20 | 5.2 | 2.08 | 7.28 | 50.413 |
| 16 | 16 | 20 | 5.2 | 4.16 | 9.36 | 50.413 |

TABLE 2

Ratio guaranteed rate over net rate for different interarrival time and INP.

| | | minimum interarrival (ms) | | | | |
|---|---|---|---|---|---|---|
| ratio $R_{in}/R_d$ | | 8 | 16 | 32 | 64 | 128 |
| | 1 | 0.97 | 0.98 | 0.99 | 1.00 | 1.00 |
| INPmin | 2 | 0.93 | 0.97 | 0.98 | 0.99 | 1.00 |
| (DMT) | 4 | 0.87 | 0.93 | 0.97 | 0.98 | 0.99 |
| | 8 | 0.73 | 0.87 | 0.93 | 0.97 | 0.98 |
| | 16 | 0.47 | 0.74 | 0.87 | 0.93 | 0.97 |

NOTE:
$R_d$ is the net data rate without retransmission and Rin is the guaranteed net data rate if impulse event of length INPmin DMT symbols arrives every inter-arrival time.

TABLE 3

Maximum net rate of an interleaver scheme with various MaxDelay and INPmin.

| INPmin | MaxDelay (ms) | Max Net rate (Mbps) | RS overhead (R/N) |
|---|---|---|---|
| 1 | 6 | 101.22 | 10.8% |
| 2 | 6 | 64.44 | 16.7% |
| 4 | 7 | 30.72 | 28.6% |
| 8 | 8 | 12.28 | 50% |
| 16 | 10 | No solution | No solution |

By comparing these tables, it can be determined that, with equivalent delay, the interleaver performs better than the retransmission in terms of maximal achievable rate for low INP requirements (e.g. 1 or 2 DMT symbols). In embodiments, the retransmission scheme could have better performance if the roundtrip delay were decreased. Nevertheless, the interleaver scheme may suffer of a high Reed-Solomon overhead. This high overhead leads in general to a low or negative coding gain. Moreover, it should be carried even when the line is not subject to impulses while the retransmission scheme automatically increases the net data rate in good line conditions.

Figure 7:
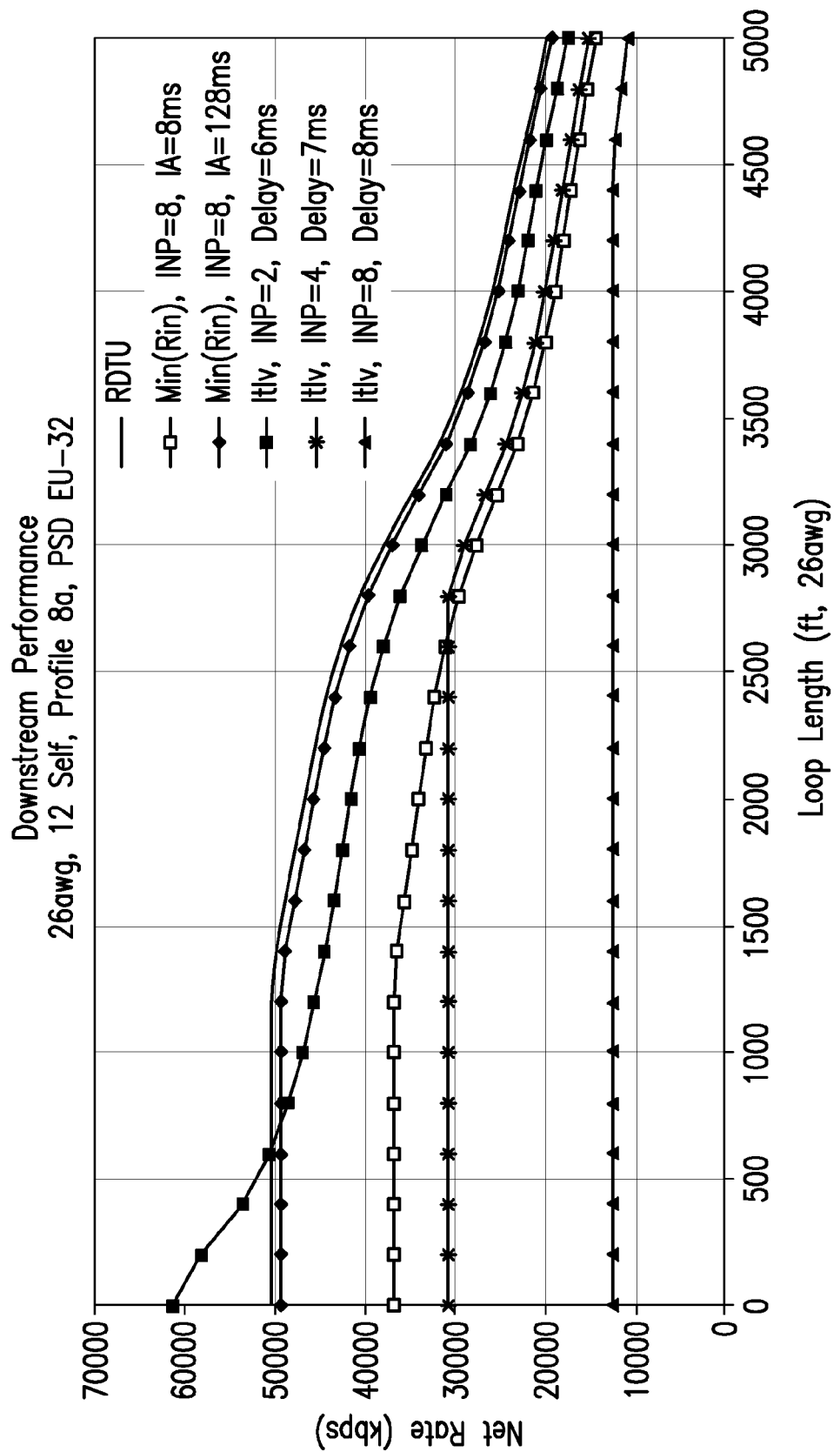
FIG. 7 illustrates the performances of an interleaver scheme.

In order to check the impact of low or negative coding gain, the performances of the interleaver scheme with the INPmin and DelayMax proposed in table 3 were compared with the performance of the retransmission mechanism where the reed-solomon overhead is near to optimum (e.g., RS(239, 255)). Performances are depicted in FIG. 7, which illustrates a comparison of interleaver and retransmission schemes on realistic loop and impulse noise.

The two curves shown with circles and squares show the respective performance of the proposed retransmission scheme with a maximal delay of 8 ms and an INPmin of 8 DMT symbols. In the first case, the inter-arrival time is set to 8 ms as it should be in case of REIN (REpetitive Impulse Noise) at 120 Hz. The performances of retransmission (square curve) outperform those obtained with the equivalent FEC scheme (triangle curve). In this embodiment, the retransmission provides around twice the INP than the FEC scheme for the same performance in case of REIN.

In the second case, the performances were computed with an inter-arrival time of 128 ms as it may be set in a SHINE (Single High Impulse Noise Event) environment. In this embodiment, the performance was almost equal to the maximal performance achievable with the best coding gain, $R_{DTU}$. This is an improvement than an FEC scheme where the amount of overhead is independent of the frequency of the worst case impulse.

Comparison Ideal Interleaver/Ideal Retransmission

The previous section compared the interleaver and retransmission schemes with the standard limitations but it is possible to compare both schemes in a more general way. The formulas of table 4 are used to make the comparison. They are derived by assuming no limitations, like memory size, Dmax, size of DTU, and a perfect granularity in the setting of the interleaver and the retransmission. They can be seen as a continuous extension of the formula for real implementations. In this table:

$R_{line}$ is the data rate at the out ptu of the encoder expressed in kbits/s.

DelayMax is the maximum dwlay in ms.

INPmin is the minimal INP in DMT symbol of duration Ts.

R is the Reed-Solomon overhead and N is the Reed-Solomon codeword length.

Roundtrip is the roundtrip in ms.

Iamin is the minimum IntervalTime in ms (as defined in section 4).

TABLE 4

Formula for ideal retransmission and interleaver

| | Interleaver | Retransmission |
|---|---|---|
| Delay (ms) | DelayMax | Roundtrip + INPMin × Ts |
| Reed-Solomon overhead (R/N) | $\max\left(\dfrac{INPMin}{2 \times DelayMax}, \dfrac{16}{255}\right)$ | $\dfrac{16}{255}$ |
| Guaranteed rate (kbps) | $Rline \cdot \left(1 - \dfrac{R}{N}\right)$ | $Rline \cdot \left(1 - \dfrac{R}{N}\right) \cdot \left(1 - \dfrac{INPMin \times T_s}{IAMin}\right)$ |
| Memory requirement (bits) | $\dfrac{DelayMax \times Rline}{2}$ | $Roundtrip \times Rline \times \left(1 - \dfrac{R}{N}\right)$ |

NOTE
The overhead of the retransmission has been selected to provide the coding gain of the concatenation of trellis and RS.

From those equations, it is possible to compare the performance of the retransmission and interleaving scheme in terms of available guarantee data rate, delay, and memory usage for a given working point. A working point is defined by a set of MIB configuration of the INPmin, DelayMax, and IAmin; a certain loop and noise condition defined by Rline; and a roundtrip delay, Roundtrip. For all embodiments, the roundtrip delay was set to 5 ms.

Figure 8:
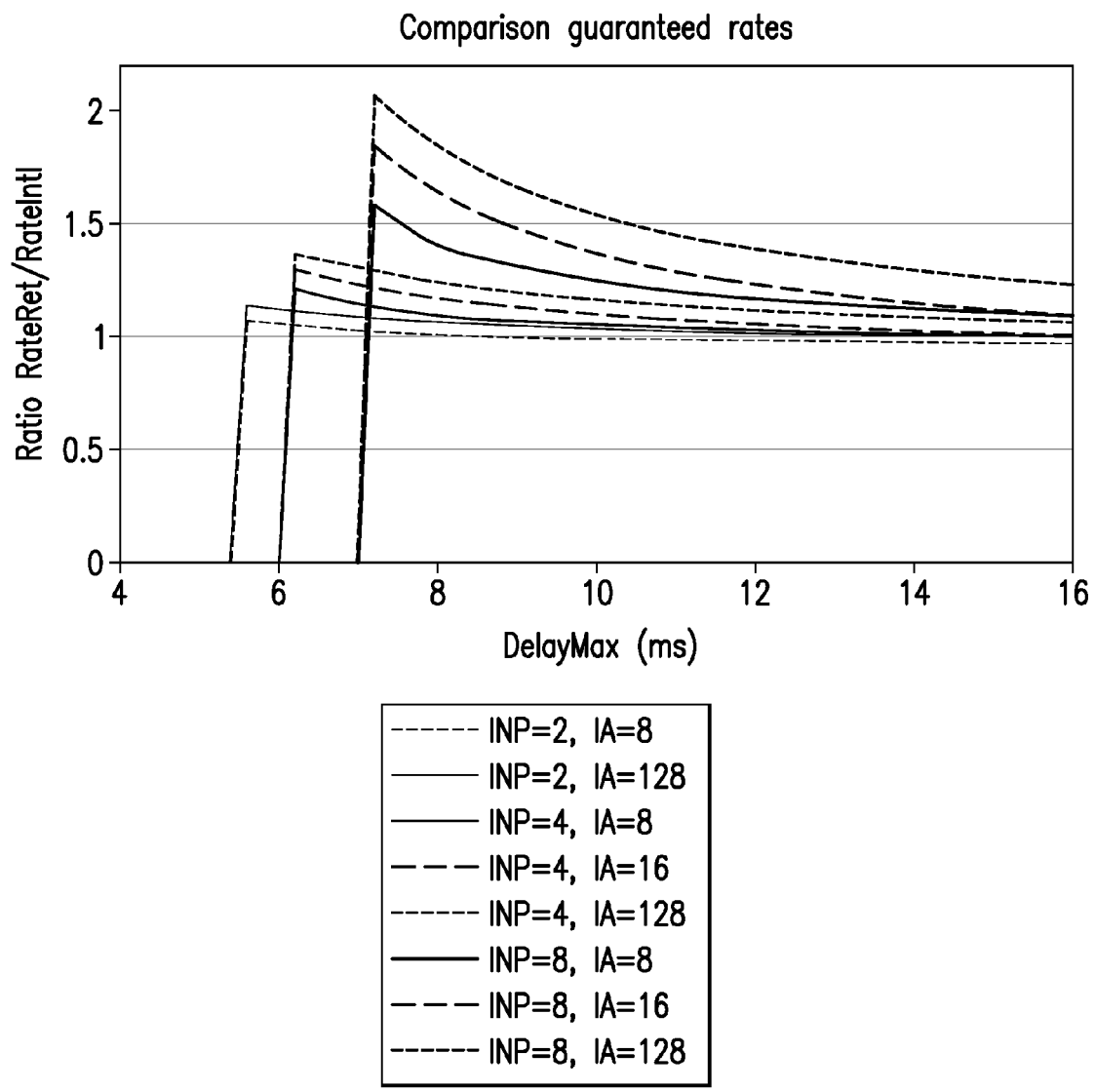
FIG. 8 is a comparison of guaranteed rate between retransmission and interleaver schemes.

FIG. 8 is a comparison of guaranteed rate between retransmission and interleaver schemes. FIG. 8 plots the ratio between the guaranteed rates for retransmission and for interleaving in function of the DelayMax for different INPmin and IAmin. As illustrated, the performance is usually better with a retransmission scheme than with an interleaver when the retransmission may be used, i.e for a delayMax above (Roundtrip+INP$_{min}$·T$_s$) ms. Moreover, the advantage of the retransmission is increasing for higher INPmin value. These results are independent of $R_{line}$, so for a given loop and noise conditions, the retransmission will usually provide a better rate than the interleaver scheme. Note that IAmin=8 ms corresponds to a REIN-like configuration (IAmin is set equal to DelayMax when DelayMax is larger than IAmin).

Figure 9:
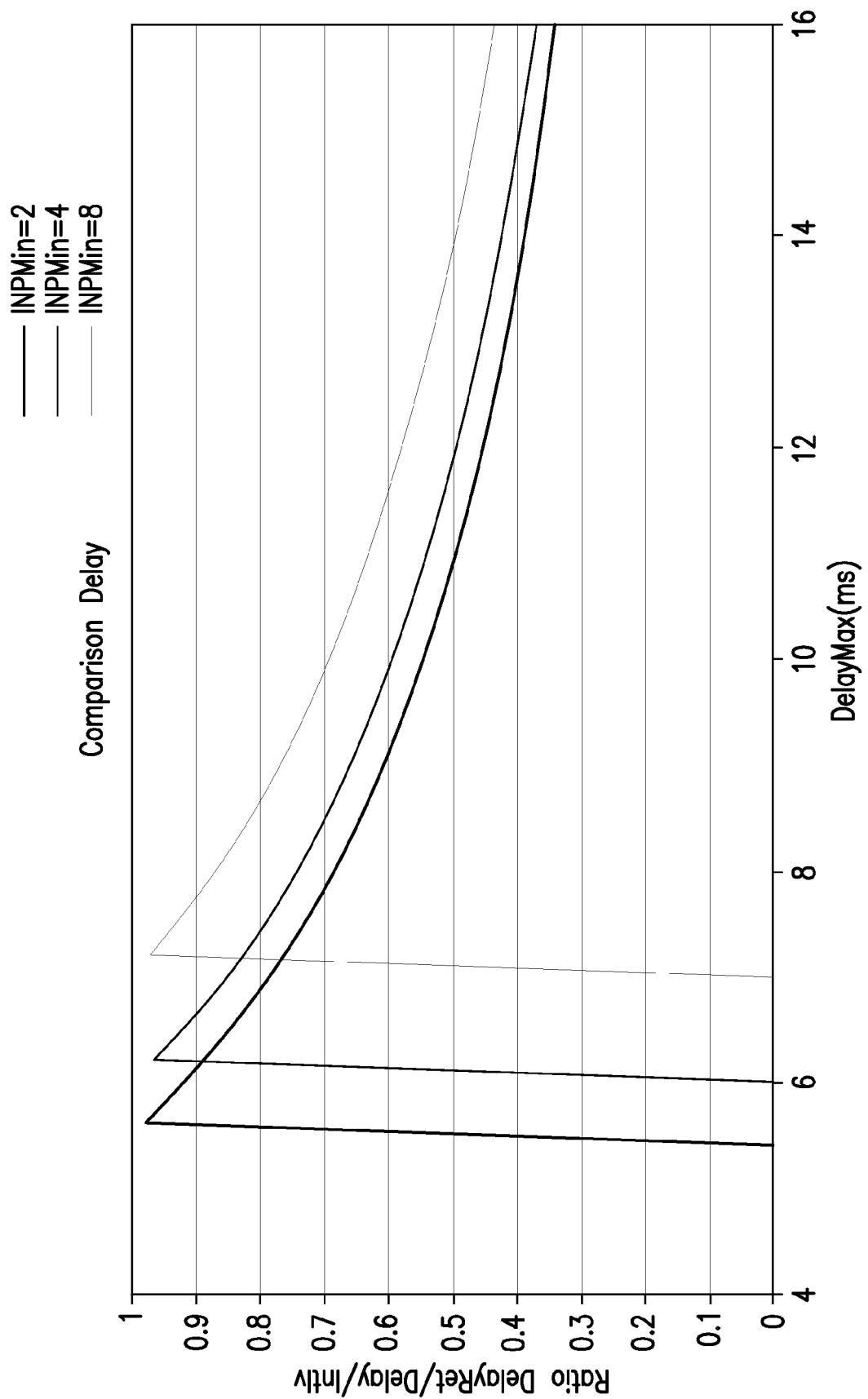
FIG. 9 illustrates the ratio between the delays for retransmission and for interleaving.

FIG. 9 illustrates the ratio between the delays for retransmission and for interleaving. This is independent of the IAmin. The retransmission has a total delay lower than the interleaver if the retransmission may be used. Moreover, as the delay of retransmission is independent of the maximum delay, the advantage of retransmission is increasing with an increase of DelayMax. These results are independent of $R_{line}$, so for a given loop and noise conditions, the retransmission will usually provide a lower delay than the interleaver scheme.

Figure 10:
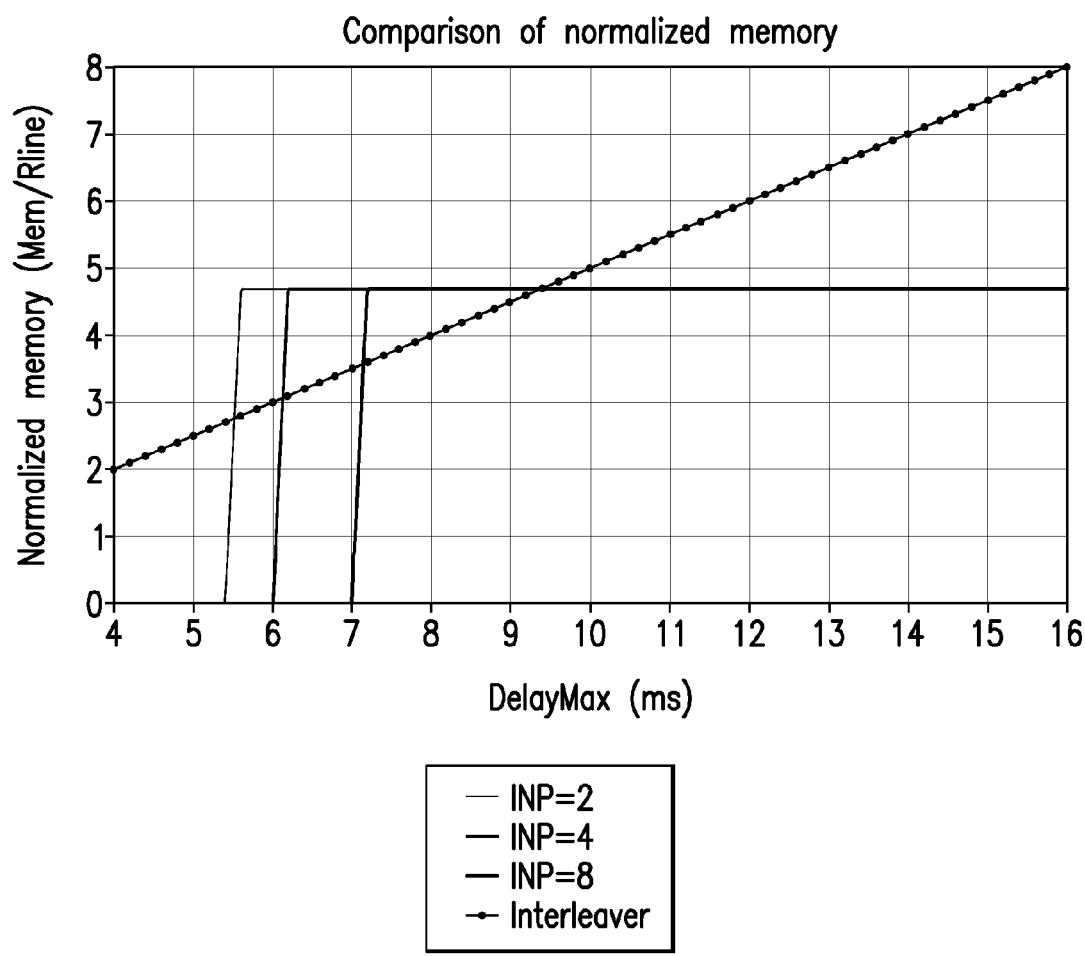
FIG. 10 illustrates the memory required for the interleaver and retransmission normalized by $R_{line}$.

FIG. 10 illustrates the memory required for the interleaver and retransmission normalized by $R_{line}$. This ratio is independent of the INPmin and IAmin. As illustrated, the retransmission used a fixed memory size while the interleaver memory increased with the delay. In fact above 9 ms of DelayMax, the retransmission used systematically less memory for an equal INPmin and $R_{line}$.

FIGS. 7-10 derived in very general conditions show that, for most usual cases, retransmission provides better performance in terms of efficiency and delay than an interleaver scheme when retransmission may be used, i.e. when delay-Max is larger than the roundtrip delay. This advantage becomes compelling for INPmin above 2. Furthermore, the retransmission usually requires less memory than the interleaver when the delay is above 9 ms.

The embodiments described above may be adapted for use in existing systems using ADSL2 and VDSL2 standards, and may introduce retransmission in a transparent way. More specifically, certain embodiments may considerably limit the jitter introduced by a retransmission event; may be compatible with all type of data transported (ATM, PTM, or any type of encapsulation protocols); may minimize the modifications to existing systems; may be coupled to the physical link where the problem occurs; and may handle retransmission inside the constrains of a fixed data frame format that cannot cope with any data loss. In one variation, one may select the best place to insert the "retransmission layer" within an existing xDSL data flow.

Error Detection

In embodiments, a retransmission scheme makes use of some kind of error detector. This error detector can be implemented in different ways and the exact implementation is unimportant considering only the feasibility of a retransmission scheme. Retransmission techniques make use of retransmission of the corrupted receive data in order to achieve the target BER requirement. One important operation is the identification of the corrupted data. This error detector has to be reliable in order to make the scheme efficient. In xDSL system, there are different types and locations for this error detector, including:

A specific detector based on some overhead added to the transmitted data

Make use of the already present CRC checksum

Make use of the already present RS overhead

Reed-Solomon FEC redundancy combines the advantages of short round trip delay and availability in xDSL systems.

RS Based Error Detection

In an embodiment, R bytes are used as Reed-Solomon overhead in a codeword of length N. The RS decoder can correct up to R/2 bytes in this codeword. Depending on the number of corrections made, one can compute the probability for a mis-correction, a correction which does do restore the original correct data. The probability is smaller as the number of corrections made to the codeword is smaller. For a given number of corrections, this probability is also smaller as the codeword length decreases.

For embodiments of the disclosed retransmission scheme, the two following characteristics are desirable. First, the error detector should have some correction capability. For instance, assume that 5% of the codeword data are corrupted for every symbols (5% of the carrying tones suddenly very noisy for a long period), if there is no correction capability, the scheme would ask a retransmission for all the symbols leading rapidly to a frozen transmission. Second, the error detector should be highly reliable. As retransmission techniques allow to get rid of the data correction techniques or at least allow to reduce their correction capability, it is important that any corrupted data is detected as such in order to be retransmitted. Otherwise the corrupted data goes through with no or only limited possibility of further correction.

The RS overhead is typically suited to cope with these two characteristics. Indeed, based on the chosen mis-correction probability $p_{mis-corr}$, the detector should correct the receive codeword if the mis-correction probability is smaller than $p_{mis-corr}$. In this case no retransmission is requested. Further, the detector should ask for a retransmission if the probability is larger than $p_{mis-corr}$. In this case, the received codeword will however be corrected in order to transfer the most likely codeword in case the retransmission does not arrive on time (before the codeword has to be transfer to upper layers).

Summary

The above described embodiments may be realized in hardware, software, or most commonly a combination thereof. Additionally, embodiments may be realized in a centralized fashion in at least one communication system, or in a distributed fashion where different elements may be spread across several interconnected communication systems. Any kind of computer system or other apparatus adapted for carrying out the methods described herein may be suited. A typical combination of hardware and software may be a general-purpose computer system with a computer program that, when being loaded and executed, may control the computer system such that it carries out the methods described herein.

Alternatively, the above described embodiments may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A apparatus for transmitting data in an xDSL system, comprising:

a transmitter that sends data over an xDSL system in the form of a data transmission unit (DTU), the transmitter having a transport, protocol specific transmission convergence (TPS-TC) communication sublayer and a physical media specific transmission convergence (PMS-TC) communication sublayer;

a retransmission layer disposed between the TPS-TC and PMS-TC communication sublayers; and a retransmission unit that is implemented in the retransmission sublayer, the retransmission unit including a retransmission buffer that stores and indexes transmitted DTUs in retransmit containers, the retransmit container being defined as a time slot corresponding to a sent DTU;

wherein the retransmission unit is configured to respond to a retransmission request indicating which stored DTU should be retransmitted, wherein the stored DTU to be retransmitted is identified by its corresponding retransmit container.

2. The apparatus of claim 1, wherein the DTU to be retransmitted is further identified by a unique sequence identification number (SID) that is added to the DTU in the retransmission sublayer.

3. The apparatus of claim 1, wherein the DTU is defined as a fixed number of bytes from an asynchronous transfer mode (ATM) cell.

4. The apparatus of claim 1, wherein the DTU is defined as a fixed number of bytes from a packet transfer mode (PTM) code word.

5. The apparatus of claim 1, further comprising a retransmission control channel coupled to the PMS-TC sublayer wherein the retransmission control channel is configured to receive the retransmission request from a receiver and retransmit the requested stored DTU.

* * * * *

UNITED STATES PATENT AND TRADEMARK OFFICE
CERTIFICATE OF CORRECTION

PATENT NO. : 8,381,055 B2  
APPLICATION NO. : 11/854022  
DATED : February 19, 2013  
INVENTOR(S) : Benoit Christiaens et al.

Page 1 of 1

It is certified that error appears in the above-identified patent and that said Letters Patent is hereby corrected as shown below:

In the Claims:

Column 16, line 44, please replace "transport," with --transport--.

Signed and Sealed this
Twenty-third Day of April, 2013

Teresa Stanek Rea
*Acting Director of the United States Patent and Trademark Office*